Nov. 7, 1933.  W. E. BURNELL  1,933,889
SLIDING BACK FOR CAMERAS
Filed Feb. 12, 1932   5 Sheets-Sheet 1
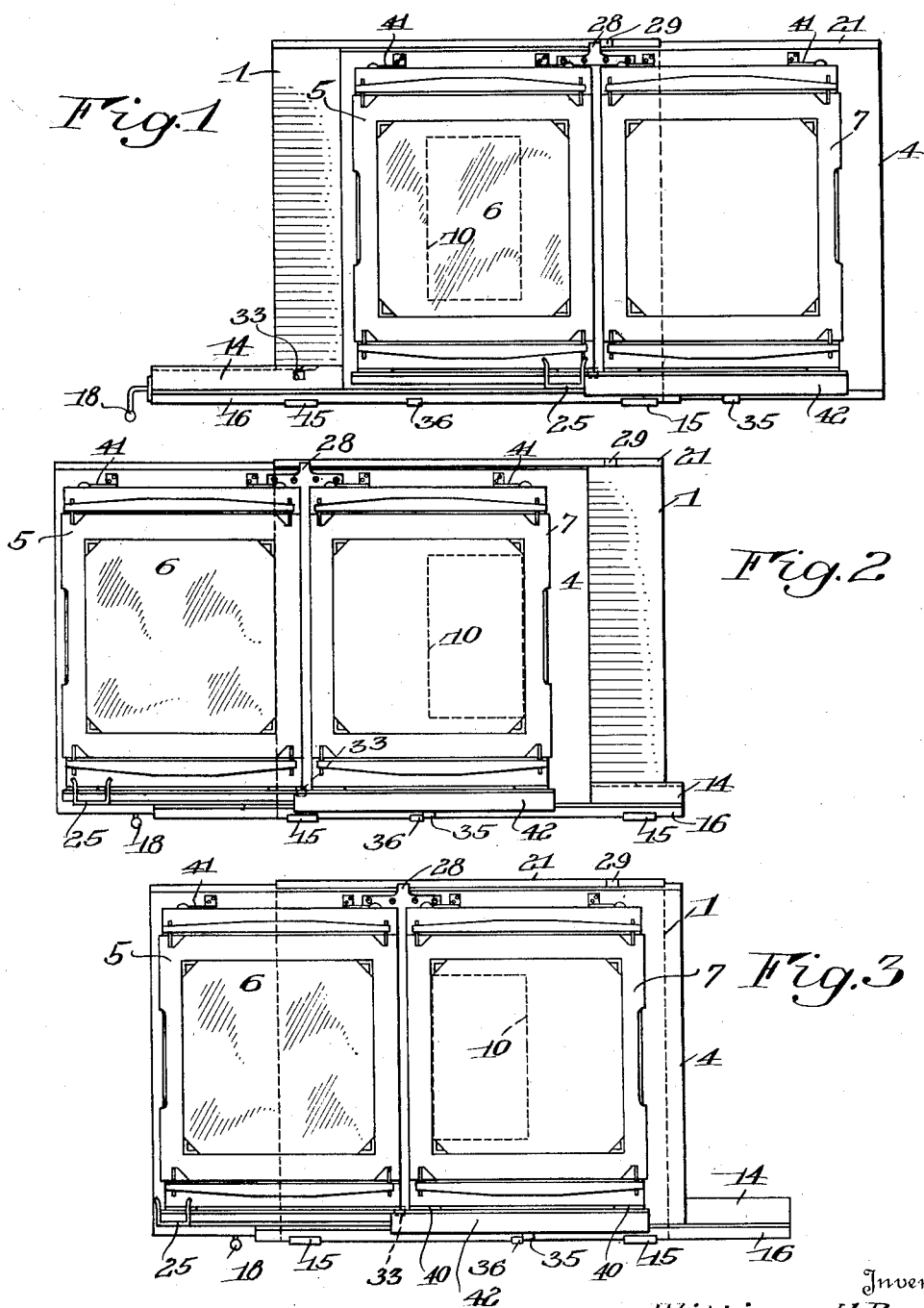

Nov. 7, 1933.  W. E. BURNELL  1,933,889
SLIDING BACK FOR CAMERAS
Filed Feb. 12, 1932  5 Sheets-Sheet 2
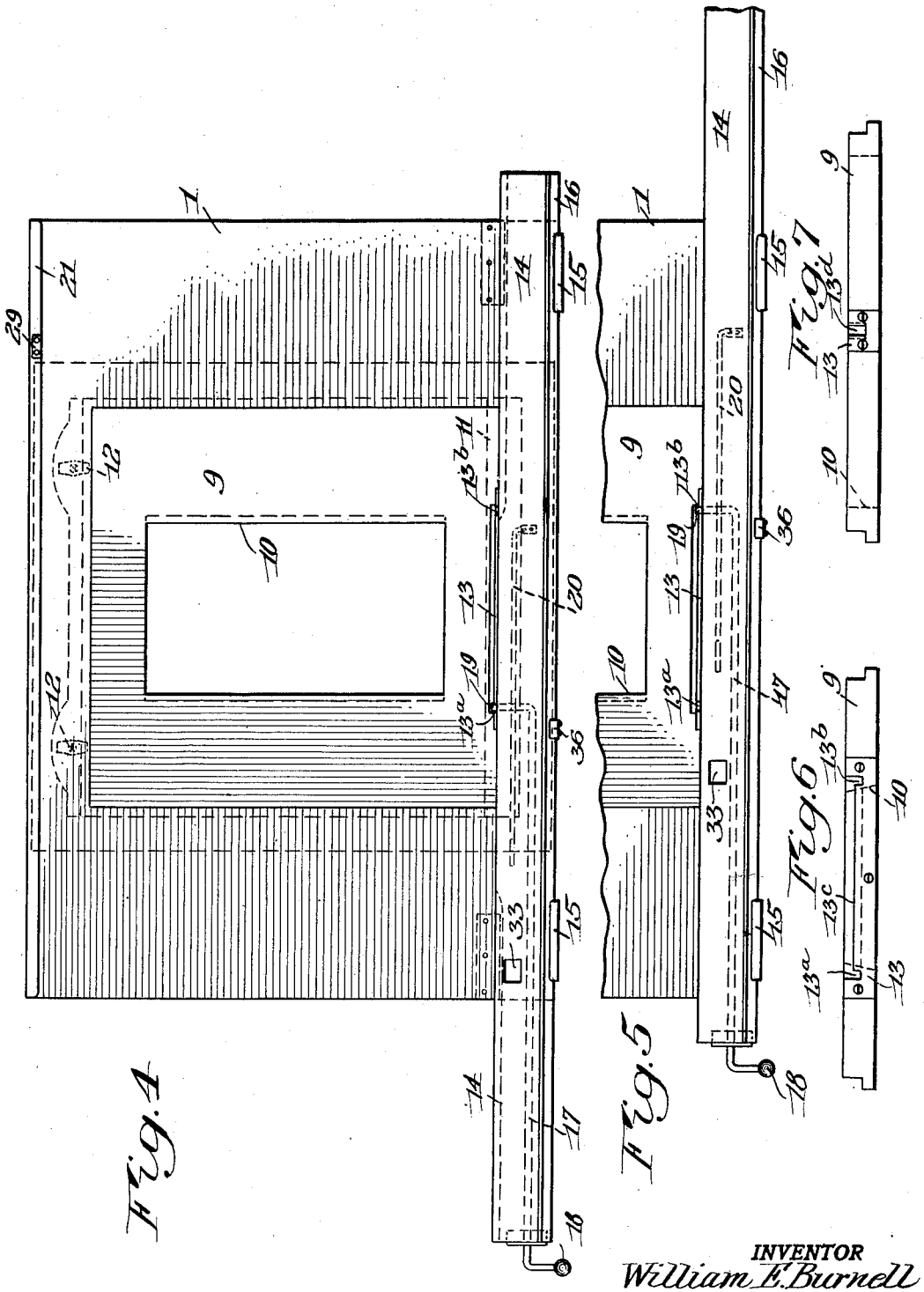
INVENTOR
William E. Burnell
BY D. Clyde Jones
his ATTORNEY Nov. 7, 1933.  W. E. BURNELL  1,933,889
SLIDING BACK FOR CAMERAS
Filed Feb. 12, 1932   5 Sheets-Sheet 3
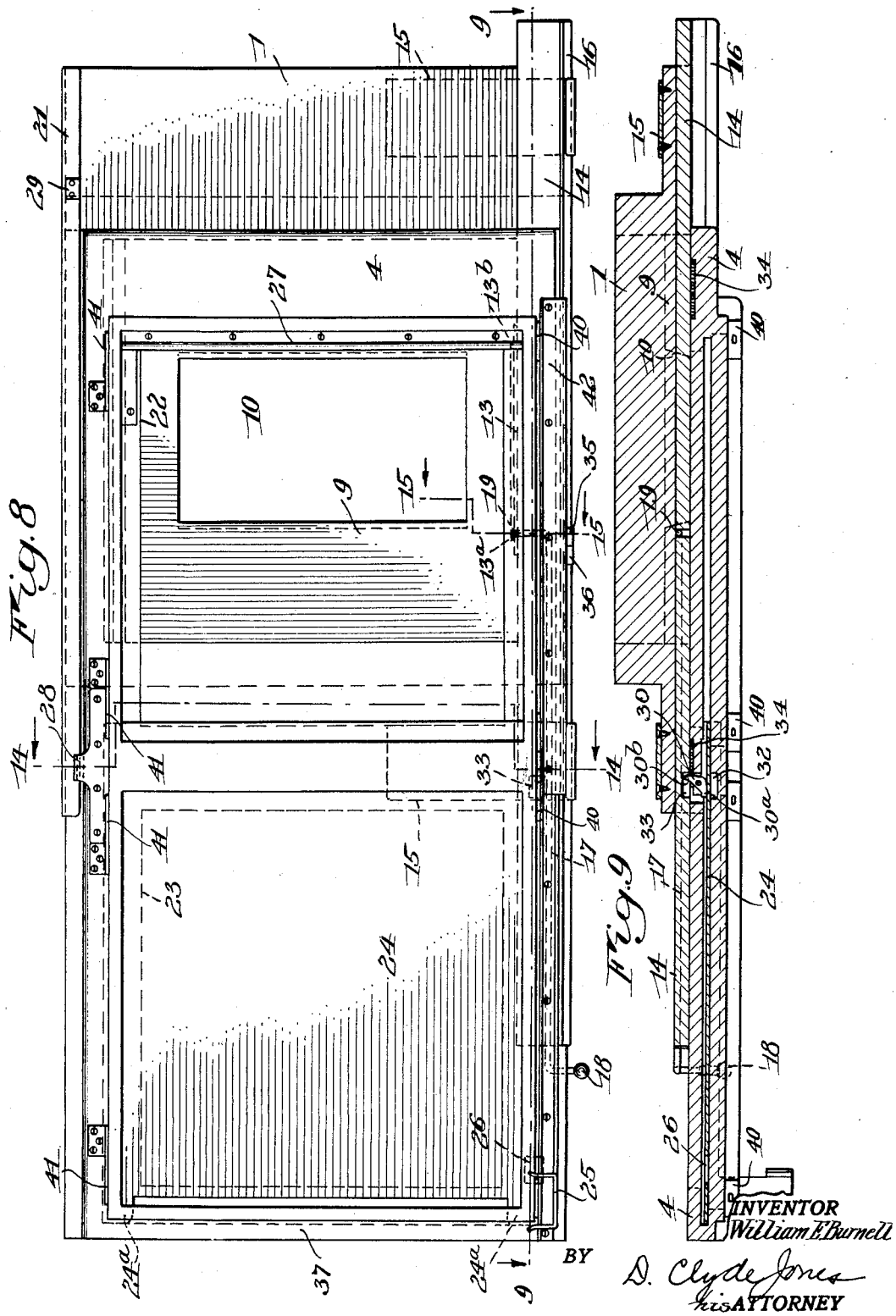

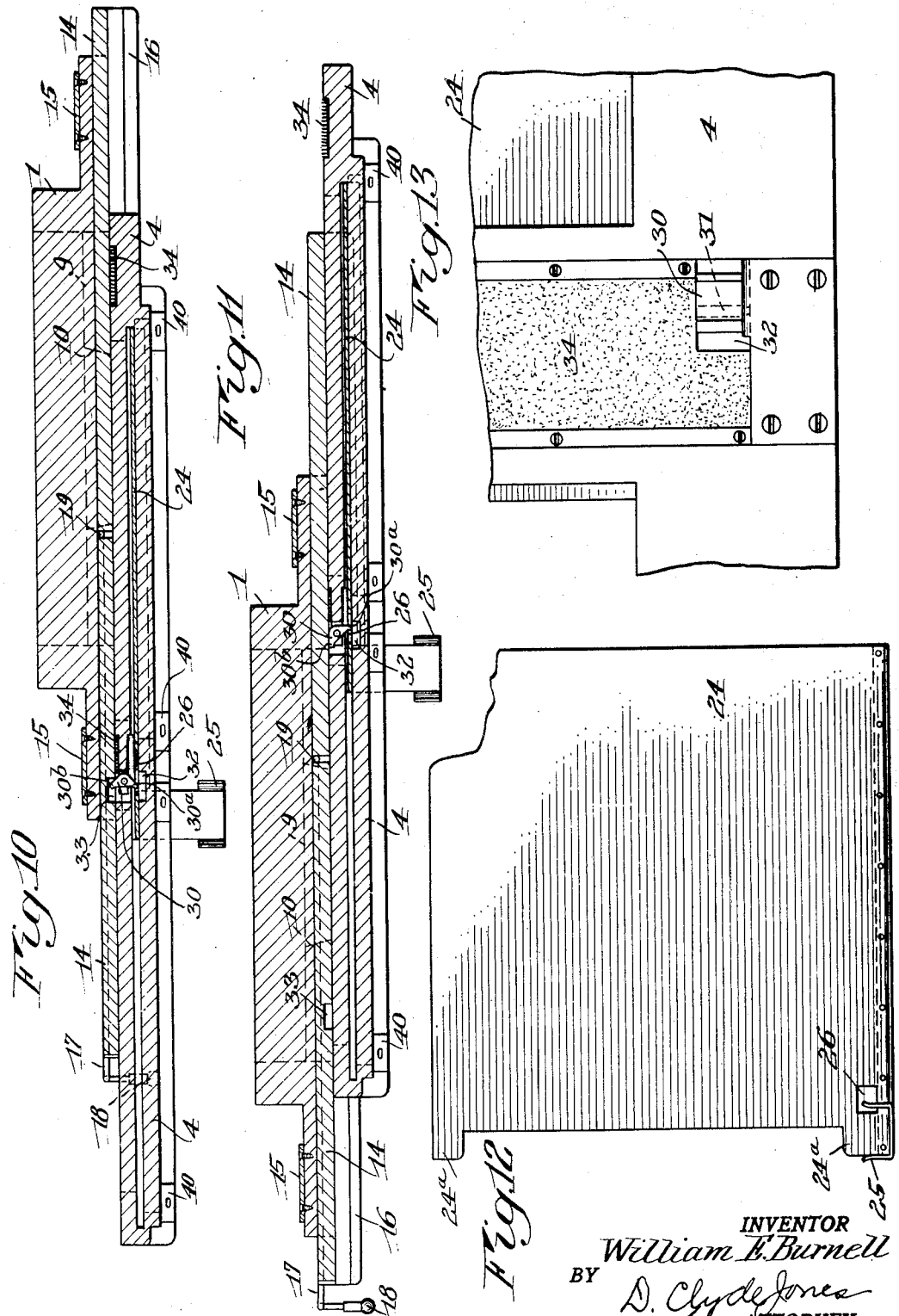

Nov. 7, 1933.   W. E. BURNELL   1,933,889
SLIDING BACK FOR CAMERAS
Filed Feb. 12, 1932   5 Sheets-Sheet 5
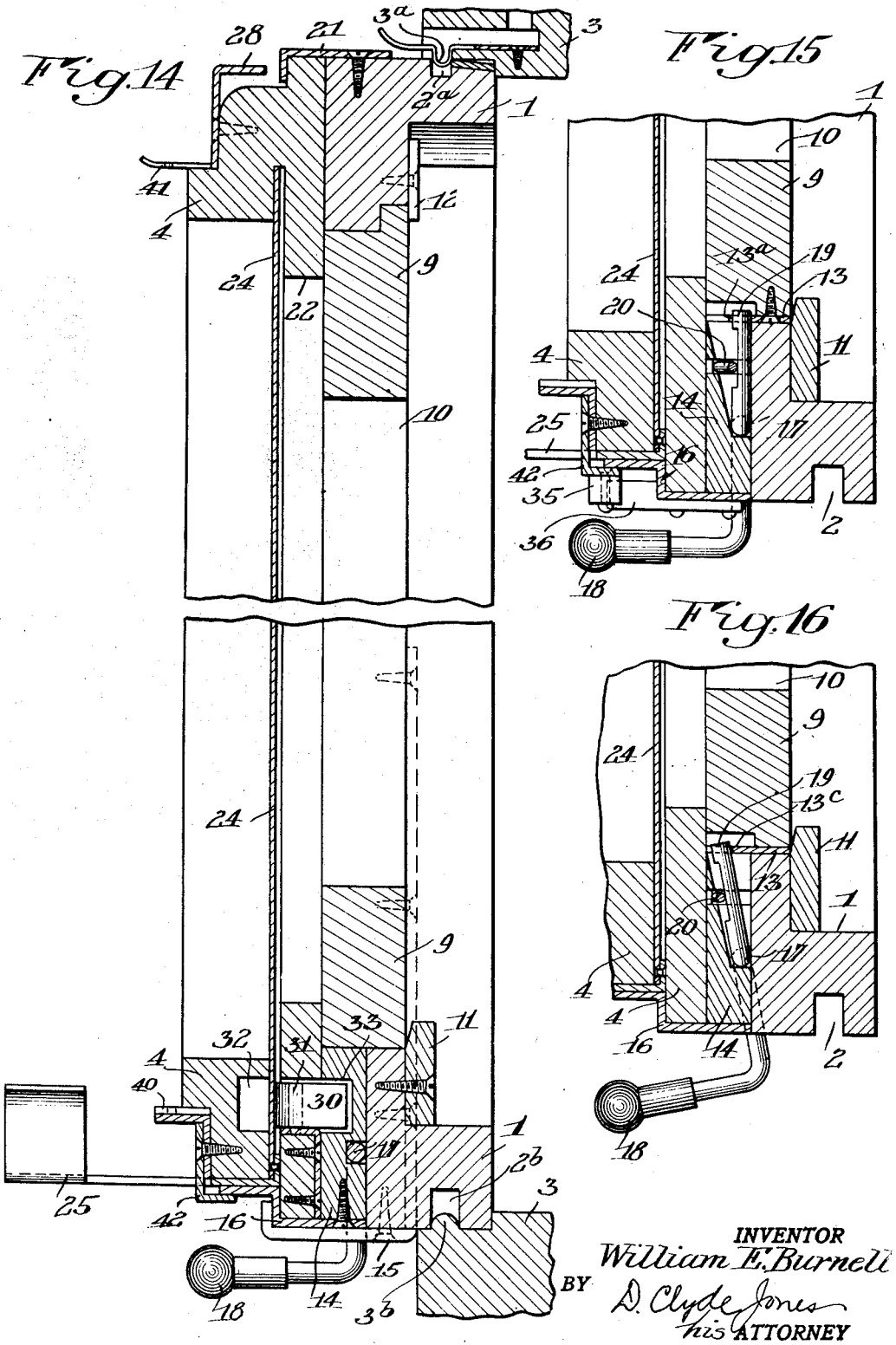
INVENTOR
William E. Burnell
BY D. Clyde Jones
his ATTORNEY Patented Nov. 7, 1933

1,933,889

UNITED STATES PATENT OFFICE 1,933,889

SLIDING BACK FOR CAMERAS

William E. Burnell, Penn Yan, N. Y.

Application February 12, 1932. Serial No. 592,592

15 Claims. (Cl. 95—37)

This invention relates to cameras and more particularly to sliding backs for cameras.

In the past, it has been proposed for reasons of economy and convenience to "split", that is to make an exposure on each of two areas of the same photographic plate or film, but in prior arrangements for effecting this result it has been necessary to remove the plate or film holder from the camera back while the subject was being viewed therethrough, to give a proper composition of the picture, and thereafter to reinsert the holder in the camera and subsequently make the separate exposures. All of this has taken time and frequently in case of certain subjects, such as children, it was found that the subject would change his pose during the time that the photographer was inserting the plate holder into the camera.

In accordance with the present invention, a sliding back for a camera is provided in which a photographic strip holder may be moved in a sliding carriage or frame to one side of the camera back even with the protective cover of the holder when it is desired to view the subject through the camera, and when the photographer has arranged a satisfactory pose by viewing the subject through the back of the camera, he can slide the carriage with the holder thereon into position to take an exposure on a predetermined half of the photographic strip. Thereafter by a simple adjustment of the carriage, he can repeat this procedure to take a second exposure on the other half of the strip. All of these results are accomplished with a minimum of effort on the part of the photographer, with a substantial saving of time, and with a substantial reduction of the interval between the viewing of the subject through the camera and the making of the exposure.

A further feature of the invention relates to an attachment for a camera whereby a plate of film holder may be moved thereby to a position outside of the focusing field of the camera and then returned to a position in the camera in such a manner that an exposure may be made on each half of the film, while protecting the respective halves of the film from undesired exposure.

These and other features of the invention will appear from the detailed description and claims when taken with the drawings, in which Fig. 1 is a front elevation of the sliding camera back of the present invention with the sliding frame positioned to permit focusing of the subject through the camera; Fig. 2 is a similar view of the sliding back with the sliding frame thereof in position to expose the righthand half of the photographic strip; and Fig. 3 is likewise a similar view of the sliding back in position to expose the lefthand half of the photographic strip; Fig. 4 is a front elevation of the sliding camera back with the sliding frame thereof removed showing the sliding frame support and the indexing bar locked in one of its positions of adjustment; Fig. 5 is a similar fragmentary view of the lower portion of the structure shown in Fig. 4 representing the index bar locked in its other position of adjustment; Fig. 6 is a view of the lower edge of one form of mask which can be detachably mounted in the support for use in splitting or taking a picture on each half of a photographic strip; Fig. 7 is the lower edge of a different form of mask which can be inserted in the support when it is desired to take but a single exposure on a photographic strip; Fig. 8 is an elevational view of the support, the index bar with its locking mechanism, and the sliding frame, all positioned to take a picture on the righthand portion of the photographic strip, and with the shield moved into its open position to permit the making of this exposure; Fig. 9 is a horizontal sectional view taken on the line 9—9 of Fig. 8 looking in the direction of the arrows; Fig. 10 is a horizontal sectional view similar to that shown in Fig. 9, except that the shield is represented as moved to its closed position and the sliding frame is indicated in the position where it is just beginning to be moved toward the right; Fig. 11 is likewise a horizontal sectional view similar to that shown in Fig. 10, except that the index bar is represented as being in its other position of adjustment and the cam latch is shown in another of its operative positions; Fig. 12 is an elevational view of the shield with a portion thereof broken away; Fig. 13 is an elevational view of a fragment of the sliding frame showing a light trapping pad and the mounting of the cam latch; Fig. 14 is a vertical section taken substantially on the line 14—14 of Fig. 8 looking in the direction of arrows; Fig. 15 is a detailed sectional view taken on the section line 15—15 of Fig. 8 representing the locking rod of the index bar in one of its locked positions; and Fig. 16 is a similar sectional view representing the locking rod on the index bar in the course of its movement from one of its locking positions to the other.

The sliding camera back of the present invention includes a support 1, which may be detachably mounted by means of its retaining grooves 2a and 2b in fixed position on the back of a camera 3 in any suitable manner such as by tongue 3b and spring latch 3a. A sliding frame 4 is mounted for limited horizontal movement on the support 1, from its focusing position shown in Fig. 1 as determined by cooperating stops 28 and 29, to one position of adjustment as shown in Fig. 2, or to a second alternate position of adjustment as shown in Fig. 3 as determined by an index bar 14. This frame carries the focusing mount 5 for the focusing screen or ground glass 6, and the well-known plate holder mount 7 (detachably held in position by brackets 40 and spring latches 41 on the frame) for supporting a plate holder or other photographic strip holder. As shown particularly in Figs. 4 and 14, the support is provided with a rectangular opening to receive any one of several masks 9, having a central aperture 10 through which the exposures of the photographic strip are made. Any one of the various masks may be readily inserted in and removed from the support opening where it is normally held by a strip 11 on the support engaging its lower portion, and by suitable turn buttons 12, also on the support, engaging its upper portion. It will be understood that the several masks have various sizes of apertures therein, depending on the desired sizes of pictures to be taken therethrough. In Figs. 4, 5, and 6, there is illustrated one type of mask, provided at its lower edge with an index plate 13 having two locking notches 13a and 13b connected by a guiding face 13c. This arrangement is particularly adapted for splitting, that is taking a separate exposure on each of the two halves of the area of a photographic strip. However, the mask shown in Fig. 7 has its index plate provided with a single locking notch 13d and is used when the whole area of the photographic strip is used for a single exposure, that is, when it is not desired to split the strip.

While different types of masks have been illustrated suitable for making either one or two exposures on a photographic strip, it will be understood that the invention includes the use of masks suitable for splitting the photographic strip into more than two exposure areas, in which case the index plates thereof will be provided with more than two locking notches, one notch being provided for each desired split or desired exposure area on the photographic strip.

On the support 1, there is also mounted for sliding movement, an index bar 14 which is adjustable to either of two alternate positions (when masks such as that shown in Fig. 6 are used) to determine the limits of movement in one direction of the sliding frame 4. As shown especially in Figs. 8, 10 and 14, this index bar is slidably mounted on the angular brackets 15 secured at the lower part of the support. This index bar has attached thereto, a track 16 of angular sheet material, preferably Z-shaped, as shown in Fig. 14 to serve as a support and guide for the sliding frame as will be further pointed out hereinafter. It will be understood that this frame is held on the track 16 by the angular bracket 21 attached to and co-extensive with the upper edge of the support, which bracket engages the edge of the upper part of the sliding frame.

The index bar has embedded therein, a rocking lock rod 17, provided at one end with a handle 18, and at its other end with an angular extension 19 adapted to engage the locking notches 13a and 13b, in the locking plate 13, being adjustable from one notch to the other in a groove defined in part by the edge 13c of the plate.

The extension 19 of the lock rod is normally held in the position shown in Fig. 15, by a spring 20 mounted in a groove in the index bar. The handle 18 of the lock rod is rocked downward against the tension of spring 20 to the position shown in Fig. 16, after which this handle is used to move the index bar horizontally from the position shown in Fig. 4 where the lock rod extension 19 is engaging the locking notch 13a, to the position shown in Fig. 5, where the extension 19 is engaging the locking notch 13b, or vice versa.

The sliding frame 4 has two rectangular openings 22 and 23, which are concealed in Figs. 1 to 3, by the plate holder mount 7 and by the mount 5 of the ground glass 6 used in focusing. In the remaining figures however, the mounts 5 and 7 have been omitted for clearness in disclosure. The rectangular opening 22 is arranged to be closed normally by a slidable shield 24, while the frame is out of the field of exposure of the camera. This shield which is provided with a handle 25, and with a rectangular latch opening 26, is arranged to be slidable in grooves in the frame and in its closed position to be in light-tight engagement therewith, since the shield in its movement toward the right, engages a stop plate and light trap 27 on the frame. It will be appreciated that as the shield 24 is moved toward the right from the position shown in Fig. 8, its righthand edge engages the stop 27 and in the further movement of the shield, the frame 4 is moved therewith until the shoulder 28 on the frame engages the fixed stop 29 on the bracket 21. The opening 26 in the shield is arranged to co-operate in certain positions of the index bar 14, with a cam latch 30, which is mounted for rocking movement on the vertical pin 31 in opening 32 in the frame. It will be understood that in other positions of the openings 26 in the shield and 33 in the index bar, the cam latch 30 assumes other positions as will be hereinafter pointed out.

It will be noted that the sliding frame is so constructed and mounted that it prevents the unwanted passage of light through the various joints of the device. This construction includes the resilient pads 34 (Figs. 10 and 13), the Z-shaped track 16, the angular strip 42 attached to the lower edge of the frame, and the combined light trap and stop 27.

In the operation of the sliding back of this invention, it will be assumed that the support 1 thereof, has been attached by means of the grooves 2a and 2b to the back of the camera 3 with which it is to be used and that a photographic strip holder such as a holder for a photographic plate or a film, has been inserted in the mount 7 in the well-known manner. It is also assumed that the index bar 14 has been positioned by means of the handle 18 of the index bar lock rod, to lock the index bar in the position shown in Fig. 8, that is, with the angular extension 19 of the lock rod engaging the notch 13a in the plate 13 on the lower edge of the mask 9. It is likewise assumed that the sliding frame 4 is in its extreme righthand position (Fig. 1) as determined by its shoulder 28 engaging stop 29 on the support, and that its rectangular exposure opening 22 is closed by shield 24. With the frame in this position, that is, with the plate holder out of the exposure field of the camera, the photographer may focus the subject and obtain the proper composition of the proposed picture by viewing the image of the subject on the ground glass 6. The protecting cover (not shown) of the plate holder may be removed during all of this period of focusing, since the photographic strip is protected by shield 24, so that when the photographer is ready to make the first exposure, it is merely necessary for him to move the handle 25 of the shield to the left as far as it will go. This movement of the shield carries the frame 4 and with it the plate holder into the exposure field of the camera, since at this time, as shown in Fig. 11, the cam latch 30 on the frame, is held by its sliding engagement with the index bar so that its free end 30a engages the edge of the opening 26 in the shield. This joint movement of the frame 4 and the shield 24 thus continues until the frame is brought to rest by the shoulder 35 on the frame engaging the stop 36 on the index bar. Since the opening 33 in the index bar, and the opening 26 in the shield are now in registry, the cam latch 30 is rocked by the continued movement of the shield, causing its end 30b (Fig. 9) to enter the opening 33 in the index bar. This permits the portion 30a of the cam latch to disengage the edge of the opening in the shield 26 so that the shield can be moved by the handle 25 toward the left independently of the frame, until the shoulders 24a on the lefthand edge of the shield, engage the lefthand upright 37 of the frame as shown in Fig. 8. The opening 22 in the sliding frame is thus brought into registry with the open back of the camera, while the opening 23 of this frame with its focusing ground glass, is moved to the left of the back of the camera and the shield 24 is also moved into registry with the opening 23. It will be noted that the opening 10 in the mask 9 is in registry with the righthand half of the photographic strip so that the photographer may make an exposure thereon by opening the shutter (not shown) on the camera.

At the end of the exposure period the shutter of the camera is closed and the sliding frame may now be moved to the right to its original position out of the field of exposure of the camera. This movement is effected by moving the handle 25 of the shield toward the right, which causes the shield to move independently of the frame until the righthand edge of the shield engages the stop plate 27 on the frame. Since the shield in this closed position makes light tight engagement with the frame about the edges of the opening 23, the photographic strip is now protected from damage by light, and the photographer may continue the movement of the handle 25 toward the right, without interruption. As a result of this further movement of the handle, the shield 24, since it now engages the stop 27, moves the frame 4 to the right until its shoulder 28 engages the stop 29. As shown in Fig. 10, at the time when the righthand edge of the shield engages the stop 27 on the frame, the recess 33 in the index bar, and the opening 26 in the shield are all in registry, so that in the further movement of the shield, the part 30b of the cam latch, engages the edge of the recess 33, whereby the cam latch is rocked to the position shown in Fig. 11. As the shield is moved to advance its opening 26 out of registry with the recess 33, the portion 30a of the cam latch extends into the opening 26, and the upper part of the cam latch 30 engages the face of the index bar, all during the time that the shield and the frame are moving together toward the right.

With the sliding frame in its extreme position at the right of the camera, the opening 23 of the frame is in registry with the back of the camera, so that the photographer can again focus the camera on the subject. Since it is now desired to make an exposure on the lefthand half of the photographic strip, the index bar 14 is moved to its second position of adjustment. This is effected by rocking handle 18 of its lock rod 17 downward as shown in Fig. 16, until the extension 19 on the rod disengages the notch 13a of the plate 13 on the lower part of the mask 9. With the handle 18 of the lock rod still held in its lower position, the index bar is advanced to its other position of adjustment by moving the handle 18, and with it the index bar until the extension 19 on the lock rod is in engagement with the notch 13b in the plate 13. This movement of the index bar moves its stop 36 to a position shown in Fig. 3 so that the shoulder 35 on the frame is stopped in its movement toward the left in a position to expose the lefthand half of the photographic strip. The shutter of the camera is opened, and the photographer having focused the camera on the subject is now ready to make the second exposure. It is now merely necessary for him to close the shutter and to move the sliding frame 4 to the left as far as it will go. This is effected by moving the handle 25 of the shield toward the left. Since the cam 30 is now engaging the face of the index bar, the finger 30a of this latch is in the opening 26 of the shield, so that as the handle 25 moves the shield to the left, the sliding frame is carried therewith until the shoulder 35 on the frame engages the stop 36 on the index bar. At this time the opening 26 in the shield and the opening 33 in the index bar are brought into registry so that the cam latch as shown in Fig. 9 disengages the opening 26 in the shield so that the shield can continue its movement to the left, independently of the frame, until the shoulders 24a on the shield engage the upright 37 of the frame. It will be noted by reference to Fig. 3 that the lefthand area of the photographic strip has been positioned opposite the opening in the mask 9 by this last mentioned movement of the frame so that an exposure can be made on the second area of the strip. The shutter of the camera (not shown) is now closed, and the frame is now moved to its original position shown in Fig. 1 in the manner already described. The photographer may then insert the protective cover (not shown) in the photographic strip holder, after which this holder may be removed from the frame and a new holder with a fresh photographic strip may be substituted therefor.

It will be noted from the foregoing description that the shield 24 protects the photographic strip from exposure all during the time that the opening 22 of the frame is outside of the field of exposure and when this opening is brought into registry with the camera, the shield automatically uncovers this opening so that an exposure may be made on the desired area of the strip. In the operation of the device for splitting the photographic strip, it is only necessary to adjust the index bar to either one of its two positions of adjustment, after which the movement of the handle 25 brings one half of the photographic strip into the exposure field of the camera, and the movement of the strip out of the exposure field is effected only after it is protected from light by being covered by the shield 24.

It has been mentioned that when it is desired to make only a single exposure on a photographic strip, a mask 9 similar to that shown in Fig. 7 is inserted in the support. When this mask is used, the extension 19 on the lock rod 17 is held by the single notch 13d in the latch plate 13. Thus the index bar has only one position of adjustment and that is with its stop 36 in proper position, so that when the shoulder 35 on the frame engages it, the frame will be brought to rest in position to expose the entire area of the photographic strip.

What I claim is:

1. In a sliding back for a camera, a support, a sliding frame provided with means to carry a focusing screen and a photographic strip holder displaced edgewise with respect to one another, said frame being movable with respect to said support, and an index member adjustable to a plurality of different positions along said support for limiting the movement of said frame in one direction to a plurality of different stopping positions.

2. In a sliding back for a camera, a support, a sliding frame adapted to carry a focusing screen and a photographic strip holder, displaced edgewise with respect to one another, said frame being movable in a rectilinear path along said support, and an index member adjustable in a rectilinear path to a plurality of positions along said support for limiting the movement of said frame in one direction to different predetermined stopping positions.

3. In a sliding back for a camera, a support, a sliding frame provided with openings spaced lengthwise thereof to receive respectively a focusing screen and a photographic strip holder, said frame being movable in a plane parallel to said support, an index member adjustable to a plurality of different positions along said support for limiting the movement of said frame in one direction, and co-operating means on said support and said frame for limiting the movement of said frame in the opposite direction.

4. In a sliding back for a camera, a support having an exposure aperture, a frame carrying a focusing screen and a photographic strip arranged side by side along said frame, means for moving said frame to present said focusing screen to said aperture and then to present first one portion of said strip to said aperture and then the other, and an adjustable index member normally engaging said support for determining the order in which said portions of the photographic strip are presented to said aperture.

5. In a sliding back for a camera, a support having an opening therein, a series of masks each having a different sized aperture from the others, anyone of which masks may be detachably mounted in said support, a plurality of locking means on each mask spaced apart at a distance corresponding to the size of the aperture therein, an index bar arranged to be locked in positions of adjustment corresponding to said locking means, a frame supporting a photographic strip for movement to position portions of said strip successively in exposure relation to the aperture in said mask, and means including said index bar for determining the movement of said frame.

6. In a sliding back for a camera, a support having an opening therein, a series of masks each having a different sized aperture from the others, anyone of which masks is detachably mounted in said support, a plurality of locking means on each mask spaced apart at a distance corresponding to the size of the aperture therein, an index bar adjustable on said support and arranged to be locked in any one of several positions of adjustment corresponding to the positions of said locking means, a frame slidable in said support, said frame carrying a photographic strip for movement to position portions thereof successively in exposure relation to the aperture in said mask, means including said index bar for determining the limit of movement in one direction of said frame, and co-operating means on said frame and on said support for limiting the movement of the frame in the opposite direction.

7. In a sliding back for a camera, a support having an opening therein, a mask detachably mounted in said opening, said mask having an exposure aperture therein, a plurality of locking means on said mask spaced apart at a distance corresponding to the size of its aperture, an index bar slidable on said support and arranged to be locked in any one of its several positions of adjustment corresponding to the positions of said locking means, a frame arranged to carry a photographic strip, said frame being movable on said index bar to present different areas of said photographic strip in exposure relation to the aperture in said mask as determined by the position of the index bar, a shield normally covering the opening in said frame, and means for moving said shield to uncover the opening in said frame after said frame is stopped in a position in exposure relation to said aperture.

8. In a sliding frame for a camera, a support having an opening therein, a mask detachably mounted in said opening, said mask having an exposure aperture therein, a plurality of locking means on said mask spaced apart at a distance corresponding to the size of its aperture, an index bar slidable on said support and arranged to be locked in any one of its several positions of adjustment corresponding to the position of said locking means, a frame provided with a focusing screen mount, and a photographic strip holder mount arranged side by side along the frame, said frame being movable along said support to position the focusing screen mount behind said exposure aperture, said frame being also movable in the opposite direction along said support to present different areas of said photographic strip holder mount in exposure relation to the aperture in said mask as determined by the position of the index bar.

9. In a sliding frame for a camera, a support having an opening therein, a mask detachably mounted in said opening, said mask having an exposure aperture therein, a plurality of locking means on said mask spaced apart at a distance corresponding to the size of its aperture, an index bar slidable on said support and arranged to be locked in any one of its several positions of adjustment corresponding to the position of said locking means, a frame provided with a focusing screen and a photographic strip holder arranged side by side along the frame, said frame being movable in one direction to position said focusing screen behind said exposure aperture, said frame being also movable in the opposite direction along said support to present different areas of said photographic strip holder in exposure relation to the aperture in said mask as determined by the position of the index bar, and a shield movable on said frame to close said photographic strip holder from exposure while said holder is out of exposure relation with respect to said aperture, and means for moving said shield to uncover said photographic strip holder after said frame has moved said holder into exposure relation with respect to said aperture.

10. In a sliding frame for a camera, a support having an opening therein, a mask detachably mounted in said opening, said mask having an exposure aperture therein, a plurality of locking means on said mask spaced apart at a distance corresponding to the size of its aperture, an index bar slidable on said support and arranged to be locked in any one of its several positions of adjustment corresponding to the position of said locking means, a stop mounted on said index bar, a frame arranged to carry a focusing screen and a photographic strip placed side by side along the frame, said frame being movable in one direction to position said focusing screen behind said exposure aperture, said frame being also movable in the opposite direction along said support to present different areas of said photographic strip in exposure relation to the aperture in said mask as determined by the position of the stop on the index bar, a shield protecting said photographic strip from exposure while said focusing screen is in registry with said aperture, and means to actuate said frame and said shield as a unit for moving said focusing screen away from said aperture and for positioning a portion of said photographic strip in exposure relation to said aperture, said means thereafter serving to move said shield independently of said frame to uncover the mentioned portion of said photographic strip.

11. In a sliding back for a camera, a support having an opening therein, a series of masks each having a different sized aperture from the others, any one of which masks is detachably mounted in said support, a plurality of locking means on said mask spaced apart at a distance corresponding to the size of the aperture therein, an index bar adjustable on said support and arranged to be locked in any one of said positions of adjustment corresponding to the positions of said locking means, a frame slidable on said support and provided with an opening to receive a focusing screen and a second opening out of registry with the first, to receive a photographic strip holder, said frame being movable in one direction to position the focal screen opening thereof behind the aperture in said mask, said frame being also movable in the opposite direction to position portions of said photographic strip opening successively behind the aperture in said mask, and means including said index bar for successively determining the limits of movement of said frame in the last mentioned direction.

12. In a sliding back for a camera, a support having an opening therein, a mask provided with an aperture mounted in said opening, a plurality of locking notches on said mask spaced apart at a distance related to the size of said aperture, an index bar adjustable on said support and arranged to be locked in any one of said notches in accordance with its position of adjustment, said index bar being provided with a stop and with a recess, a frame provided with a cam latch and with an exposure opening adapted to receive a photographic strip holder, said frame being movable to position said exposure opening out of exposure relation to said aperture, and a light shield mount to slide on said frame and arranged in one position thereto to cover said exposure opening, said shield being provided with a handle and with a recess adapted in certain positions thereof to receive said cam latch, said handle serving to move the frame and the shield as a unit to said stop while said cam latch is in said shield recess, said handle also serving to move said shield independently of said frame as soon as said recesses are brought into registry with said cam latch.

13. In a camera, means for taking pictures on at least two different portions of a sensitized surface, said means comprising a support at the back of the camera, a slidable frame received by said support and carrying a focusing screen and a sensitized surface side by side, and an index member slidable to a plurality of different positions with respect to the support, to determine the proper positioning of the slidable frame.

14. In a camera, means for taking pictures on at least two different portions of a sensitized surface, said means comprising a support at the back of the camera, a transversely slidable frame received by said support and carrying a focusing screen and a sensitized surface side by side, and a transversely slidable index member adapted to be slid into any one of a plurality of different positions with respect to the support, thereby to determine the proper positioning of the slidable frame.

15. In a camera, means for taking pictures on at least two different portions of a sensitized surface, said means comprising a support at the back of the camera, a slidable frame received by said support and carrying a focusing screen and a sensitized surface side by side, and an index member slidable to either of two positions only of adjustment, to determine the proper positioning of the slidable frame.

WILLIAM E. BURNELL.